E. McClintock.
Gas-Fixtures.
Nº 76222. Patented Mar. 31, 1868.
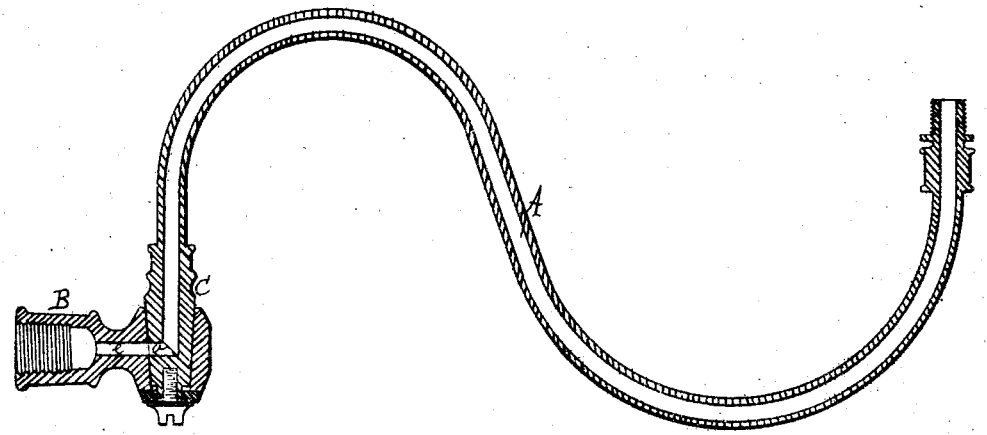
Witnesses.
Theo Tusche
W. Truwin
Inventor:
E. McClintock
Per Munn
Attorneys

United States Patent Office.

EMORY McCLINTOCK, OF NEW BRUNSWICK, NEW JERSEY.

*Letters Patent No. 76,222, dated March 31, 1868.*

IMPROVEMENT IN GAS-FIXTURES.

*The Schedule referred to in these Letters Patent and making part of the same.*

TO ALL WHOM IT MAY CONCERN:

Be it known that I, EMORY McCLINTOCK, of New Brunswick, in the county of Middlesex, and State of New Jersey, have invented a new and improved Gas-Fixture; and I do hereby declare that the following is a full, clear, and exact description thereof, which will enable others skilled in the art to make and use the same, reference being had to the accompanying drawing, forming a part of this specification.

This invention relates to a new device whereby the ordinary gas-cock is dispensed with in gas-fixtures for illuminating purposes, as, for instance, gas-brackets for rooms and for other positions where gas-fixtures are arranged for illuminating purposes; and the invention consists in combining the movable pipe with the movable tap of the joint in such a manner that when the latter is in one or more particular positions, the gas will flow through it, but when in all other positions the gas will be cut off; the object being to dispense with the gas-cock, lessen the expense, and render the fixture more convenient for use.

The drawing represents a longitudinal section of a gas-bracket arranged in the pipe according to my plan.

A is the bracket-pipe. B is the gas-pipe. C represents the tap on the end of the bracket. This tap is fastened in the pipe with a screw and washer in the usual way. The orifice $d$, through the tap C, is made as represented in the drawing. As shown, the holes in the tap, and the hole $e$ in the pipe B, register or correspond, and gas will flow through to the burner; but if the bracket is turned so that these holes do not register, the flow of gas will be cut off. There may be more than one of the holes $d$ in the tap, so that the gas will flow through when the bracket stands in other positions.

I am aware that gas-brackets are not uncommon, formed with two or more sections, for the extension or adjustment of the burner, and that the joints or taps by which the sections are connected together allow the gas to flow through when they stand in any position, but I am not aware that those joints or taps have been hitherto so formed that the flow of gas could be stopped or cut off by turning the bracket, or the sections of it, where they have been used for illuminating purposes.

By this arrangement the gas-cock is entirely unnecessary, and its whole expense is saved in the fixture, while the gas is much easier controlled by using the bracket as a lever than by turning the ordinary gas-cock, which frequently sticks in its socket, rendering it difficult to control the flow of the gas.

Having thus described my invention, what I claim as new, and desire to secure by Letters Patent, is—

As a new article of manufacture, a revolving gas-bracket for illuminating-gas, constructed as described, in such a manner that when the bracket stands in one or more particular positions, the gas will flow through it, but when turned in all other positions the flow of gas will be cut off, as herein shown and described.

The above specification of my invention signed by me, this 4th day of September, 1867.

EMORY McCLINTOCK.

Witnesses:
WM. F. McNAMARA,
ALEX. F. ROBERTS.